(12) United States Patent
Sato et al.

(10) Patent No.: US 6,779,639 B2
(45) Date of Patent: Aug. 24, 2004

(54) FLUID TRANSMISSION SYSTEM WITH LOCK-UP CLUTCH

(75) Inventors: Naoto Sato, Shizuoka (JP); Morihiro Watanabe, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/290,447

(22) Filed: Nov. 8, 2002

(65) Prior Publication Data

US 2003/0106756 A1 Jun. 12, 2003

(30) Foreign Application Priority Data

Nov. 12, 2001 (JP) ........................................ 2001-346513

(51) Int. Cl.[7] .............................................. F16D 45/02
(52) U.S. Cl. ........................................ 192/3.29; 192/212
(58) Field of Search .............................. 192/3.28, 3.29, 192/3.3, 212; 464/66, 67

(56) References Cited

U.S. PATENT DOCUMENTS

| | | | | |
|---|---|---|---|---|
| 4,646,886 A | * | 3/1987 | Nishimura | .................. 192/3.28 |
| 5,743,365 A | * | 4/1998 | Makino | ...................... 192/3.29 |
| 5,934,426 A | * | 8/1999 | Hinkel et al. | .............. 192/3.28 |
| 6,056,093 A | * | 5/2000 | Hinkel | ....................... 192/3.29 |
| 6,354,420 B1 | * | 3/2002 | Yabe | .......................... 192/212 |

FOREIGN PATENT DOCUMENTS

JP        2001-198691        7/2001

* cited by examiner

*Primary Examiner*—Saúl J. Rodríguez
(74) *Attorney, Agent, or Firm*—Arent Fox PLLC

(57) ABSTRACT

In a fluid transmission system with a lock-up clutch including a plurality of first transmitting claws provided in a clutch piston and inserted between adjacent damper springs, and a plurality of second transmitting claws provided in a turbine impeller and inserted between the adjacent damper springs to oppose the first transmitting claws, the plurality of second transmitting claws are welded to the turbine impeller in a separated and independent manner. Thus, the second transmitting claws can be fabricated with a good yield, and are applicable commonly to various fluid transmission systems of different specifications, leading to a remarkable reduction in cost.

9 Claims, 5 Drawing Sheets

FLUID TRANSMISSION SYSTEM WITH LOCK-UP CLUTCH

BACKGROUND OF THE INVENTION

1. Field of the Invention

The present invention relates to an improvement in a fluid transmission system with a lock-up clutch, comprising a plurality damper springs accommodated in an annular arrangement in an annular spring-accommodating groove defined in a clutch piston of the lock-up clutch, a plurality of first transmitting claws provided on the clutch piston and each inserted between adjacent damper springs, and a plurality of second transmitting claws provided on a turbine impeller and each inserted between the adjacent damper springs in an opposed relation to the first transmitting claws.

2. Description of the Related Art

Such a fluid transmission system with a lock-up clutch is already known, as disclosed, for example, in Japanese Patent Application Laid-open No. 2001-198691.

In the known fluid transmission system with the lock-up clutch, to provide the plurality of second transmitting claws on the turbine impeller, an annular member made of a steel plate and having the plurality of second transmitting claws integrally formed thereon is welded to the turbine impeller.

The annular member provided with the second transmitting claws is fabricated by pressing, but the fabrication has a poor yield, which is an obstacle to a reduction in cost. Moreover, the number of the second transmitting claws formed on the one annular member is selected depending on the specification of the fluid transmission system and hence, a plurality of types of annular members having different numbers of second transmitting claws in dependence to fluid transmission systems of different specifications must be prepared, and thus, it is further difficult to reduce the cost. In addition, the annular member is welded over its entire periphery of the turbine impeller. This is accompanied by a problem that the turbine impeller receives a large quantity of heat during welding of the annular member and hence, a thermal strain is liable to be produced in the turbine impeller.

SUMMARY OF THE INVENTION

Accordingly, it is an object of the present invention to provide a fluid transmission system with a lock-up clutch, wherein the second transmitting claws can be fabricated with a good yield and are applicable commonly to various fluid transmission systems of different specifications, leading to a remarkable reduction in cost, and during welding of the second transmitting claws to the turbine impeller, the quantity of heat applied to the turbine impeller can be minimized, whereby the thermal strain of the turbine impeller can be suppressed.

To achieve the above object, according to a first feature of the present invention, there is provided a fluid transmission system with a lock-up clutch, comprising a plurality damper springs accommodated in an annular arrangement in an annular spring-accommodating groove defined in a clutch piston of the lock-up clutch, a plurality of first transmitting claws provided on the clutch piston and each inserted between adjacent damper springs, and a plurality of second transmitting claws provided on a turbine impeller and each inserted between the adjacent damper springs in an opposed relation to the first transmitting claws, wherein the plurality of second transmitting claws are welded to the turbine impeller in a separated and independent manner.

With the first feature, the plurality of second transmitting claws are separated and independent from one another and hence, a large number of transmitting claws can be fabricated with a good yield. Moreover, the transmitting claws are applicable to any of various fluid transmission systems by setting the number of second transmitting claws used and a mounting pitch freely depending on the specification of the fluid transmission system, leading to a remarkable reduction in fabrication cost.

In addition, the plurality of second transmitting claws are welded in a dispersed manner to the turbine impeller and hence, the turbine impeller receives a smaller quantity of heat, and thus, the thermal strain of the turbine impeller can be minimized.

Further, the plurality of second transmitting claws welded to the turbine impeller are separated from one another with no member obstructing the flow of a working fluid being present between the second transmitting claws and hence, the flow of the working fluid to the lock-up clutch is smoothened, which can contribute to an enhancement in responsiveness of the lock-up clutch.

According to a second feature of the present invention, in addition to the first feature, each of the second transmitting claws is comprised of a claw piece inserted between the adjacent damper springs, and a mounting base integrally connected to a root of the claw piece and having a width in a direction of rotation of the turbine impeller which is set at a value larger than that of the claw piece, opposite side ends of the mounting base arranged in the direction of rotation of the turbine impeller being welded to the turbine impeller.

With the second feature, the support span of each of the second transmitting claws in the direction of rotation can be set at a large value and hence, the second transmitting claws can withstand the transmission of a large torque sufficiently.

According to a third feature of the present invention, in addition to the second feature, opposite ends of a weld zone bonding each of the side ends of the mounting base and the turbine impeller to each other are extended to points outside the side ends.

With the third feature, the mounting base of each second transmitting claw is bonded to the turbine impeller particularly at an intermediate portion of the weld zone, which is in a good welded state, and hence, the mounting base can be bonded firmly to the turbine impeller.

According to a fourth feature of the present invention, in addition to the first feature, each of the second transmitting claws is comprised of a claw piece inserted between the adjacent damper springs, and a mounting base integrally connected to a root of the claw piece and having a width in a direction of rotation of the turbine impeller which is set at a value larger than that of the claw piece, opposite side ends of the mounting base arranged in the direction of rotation of the turbine impeller and an inner end of the mounting base opposite from the claw piece being welded to the turbine impeller.

With the fourth feature, the support span of each of the second transmitting claws in the direction of rotation can be set at a large value and hence, the second transmitting claws can withstand the transmission of a large torque sufficiently. Moreover, since the three sides of the mounting base are welded to the turbine impeller, the welding strength of the mounting base can be increased sufficiently.

The fluid transmission system corresponds to a torque converter T in each of embodiments of the present invention, which will be described hereinafter.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with reference to the accompanying drawings.

Figure 1:
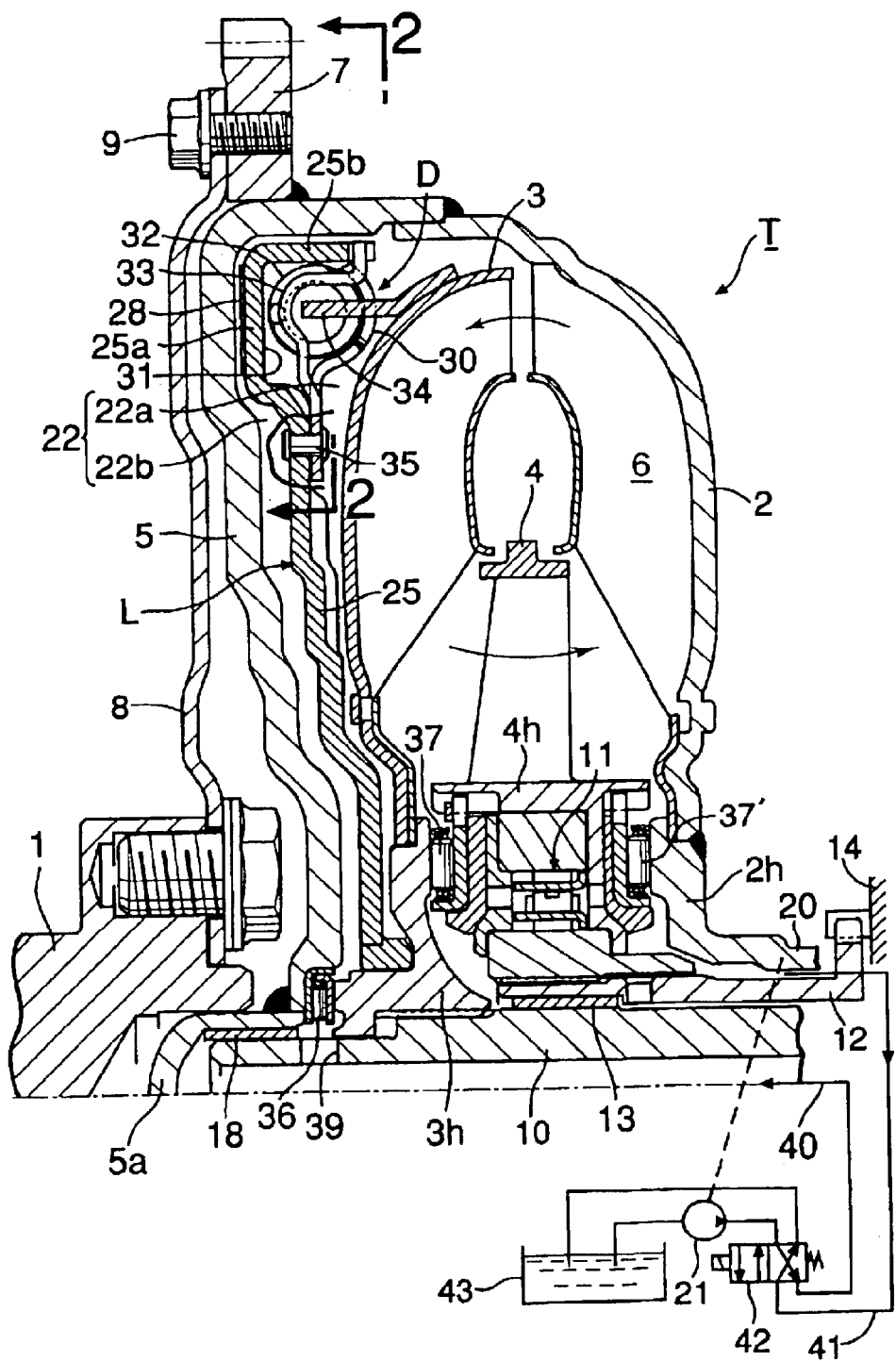
FIG. 1 is a vertical sectional side view of a torque converter with a lock-up clutch according to a first embodiment of the present invention.

Referring first to FIG. 1, a torque converter T as a fluid transmission system includes a pump impeller 2, a turbine impeller 3 opposed to the pump impeller 2, and a stator impeller 4 disposed between the inner peripheries of the pump impeller 2 and the turbine impeller 3. A circulation circuit 6 for transmitting a power by a working oil is defined among the three impellers 2, 3 and 4.

A side cover 5 is integrally connected to the pump impeller 2 by welding to cover an outer surface of the turbine impeller 3. A starting ring gear 7 is welded to an outer peripheral surface of the side cover 5, and a drive plate 8 coupled to a crankshaft 1 is secured to the ring gear 7 by a bolt 9. A thrust needle bearing 36 is interposed between a hub 3h of the turbine impeller 3 and the side cover 5.

An output shaft 10 is disposed at a central portion of the torque converter T and arranged coaxially with the crankshaft 1. The output shaft 10 is spline-fitted to the hub 3h of the turbine impeller 3 and rotatably carried on a support tube 5a at the central portion of the side cover 5 with a bearing bush 18 interposed therebetween. The output shaft 10 is a main shaft of a multi-stage transmission which is not shown.

A cylindrical stator shaft 12 is disposed around an outer periphery of the output shaft 10 to support a hub 4h of the stator impeller 4 through a free wheel 11, and a bearing bush 13 is interposed between the output shaft 10 and the stator shaft 12 to permit the relative rotation of the shafts 10 and 12. The stator shaft 12 is non-rotatably supported at its outer end on a transmission case 14.

Thrust needle bearings 37 and 37' are interposed between the hub 4h of the stator impeller 4 and the hubs 2h and 3h of the pump impeller 2 and the turbine impeller 3 opposed to the hub 4h, respectively.

An auxiliary-driving shaft 20 coupled to the pump impeller 2 is relatively rotatably disposed around an outer periphery of the stator shaft 12, and an oil pump 21 for supplying the working oil to the torque converter T is driven by the auxiliary-driving shaft 20.

The turbine impeller 3 and the side cover 5 define a clutch chamber 22 therebetween, in which a lock-up clutch L capable of coupling the turbine impeller 3 and the side cover 5 to each other is accommodated. A clutch piston 25 constituting a main member of the lock-up clutch L is disposed in the clutch chamber 22 to divide the clutch chamber 22 into an inner chamber section 22a on the side of the turbine impeller 3 and an outer chamber section 22b on the side of the side cover 5. The clutch piston 25 includes an annular web 25a bulged toward the side cover 5, and a rim 25b bent from an outer peripheral edge of the web 25a toward the turbine impeller 3. A friction lining 28 is mounted to the web 26 and opposed to an inner surface of the side cover 5. The clutch piston 25 is slidably carried on an outer peripheral surface of the hub 3h of the turbine impeller 3, so that it can be moved axially between a connecting position in which the friction lining 28 is in pressure contact with the inner surface of the side cover 5, and a non-connecting position in which the friction lining 28 is spaced apart from the inner wall of the side cover 5.

Figure 2:
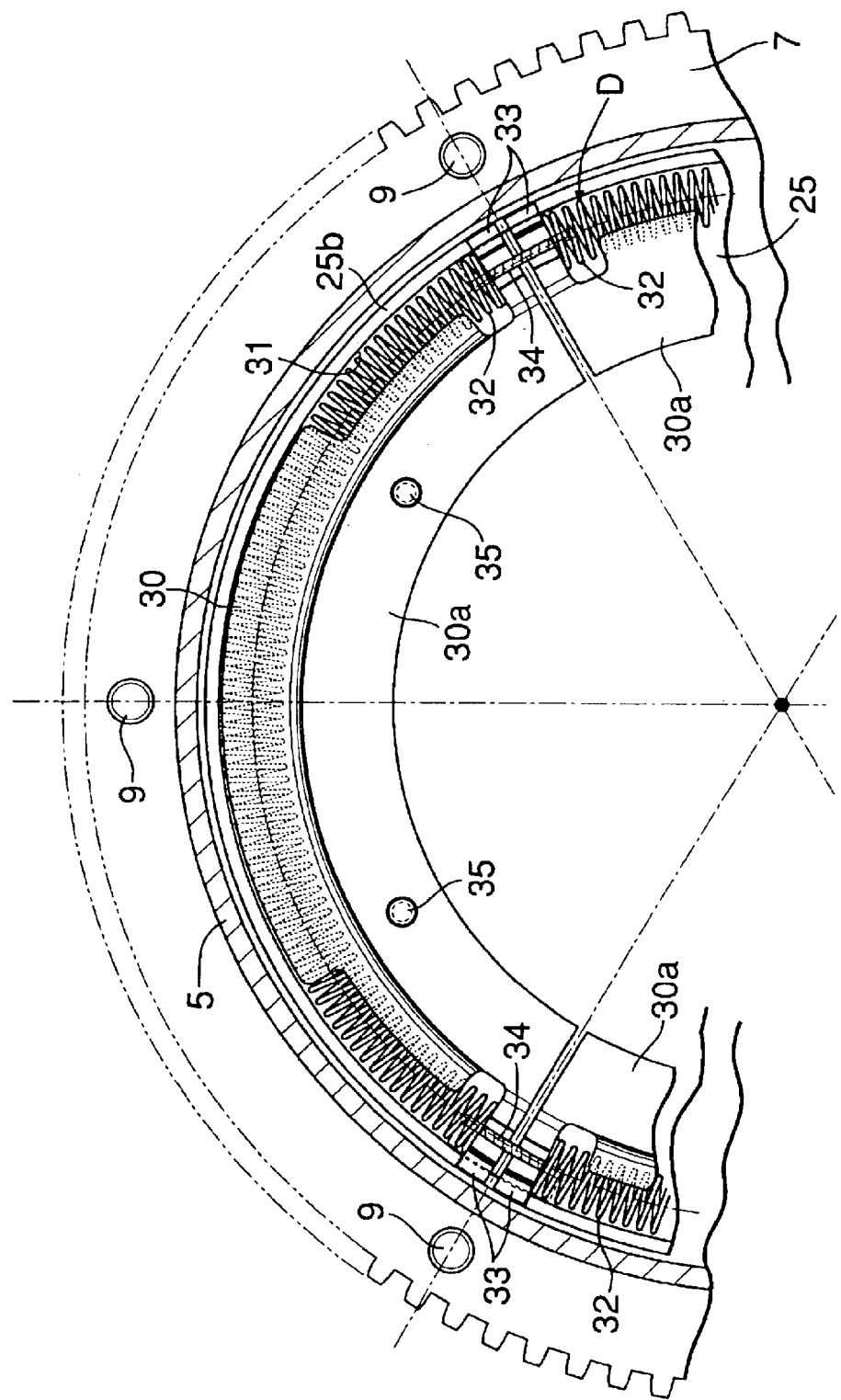
FIG. 2 is a sectional view taken along a line 2—2 in FIG. 1.

As shown in FIGS. 1 and 2, a torque damper D is disposed in the clutch chamber 22 to connect the clutch piston 25 and the turbine impeller 3 to each other in a buffering manner. The torque damper D is comprised of an annular spring-retaining member 30 secured to the clutch piston 25 by a rivet 35 to define an annular spring-accommodating groove 31 by cooperation with the rim 25b of the clutch piston 25, a plurality of (three in the illustrated embodiment) coiled damper springs 32 accommodated in the spring-accommodating groove 31 and arranged annularly, a plurality of (the same number as the damper springs 32) first transmitting claws 33 formed on the spring-retaining member 30 and each inserted between the adjacent damper springs 32, 32, and a plurality of (the same number as the damper springs 32) second transmitting claws 34 welded to the outer peripheral surface of the turbine impeller 3 and each inserted between the adjacent damper springs 32, 32, while being opposed to the first transmitting claws 33. The annular spring-retaining member 30 is comprised of a plurality of fan-shaped pieces 30a separated circumferentially at central portions of the first transmitting claws 33 in the illustrated embodiment.

Figure 3:
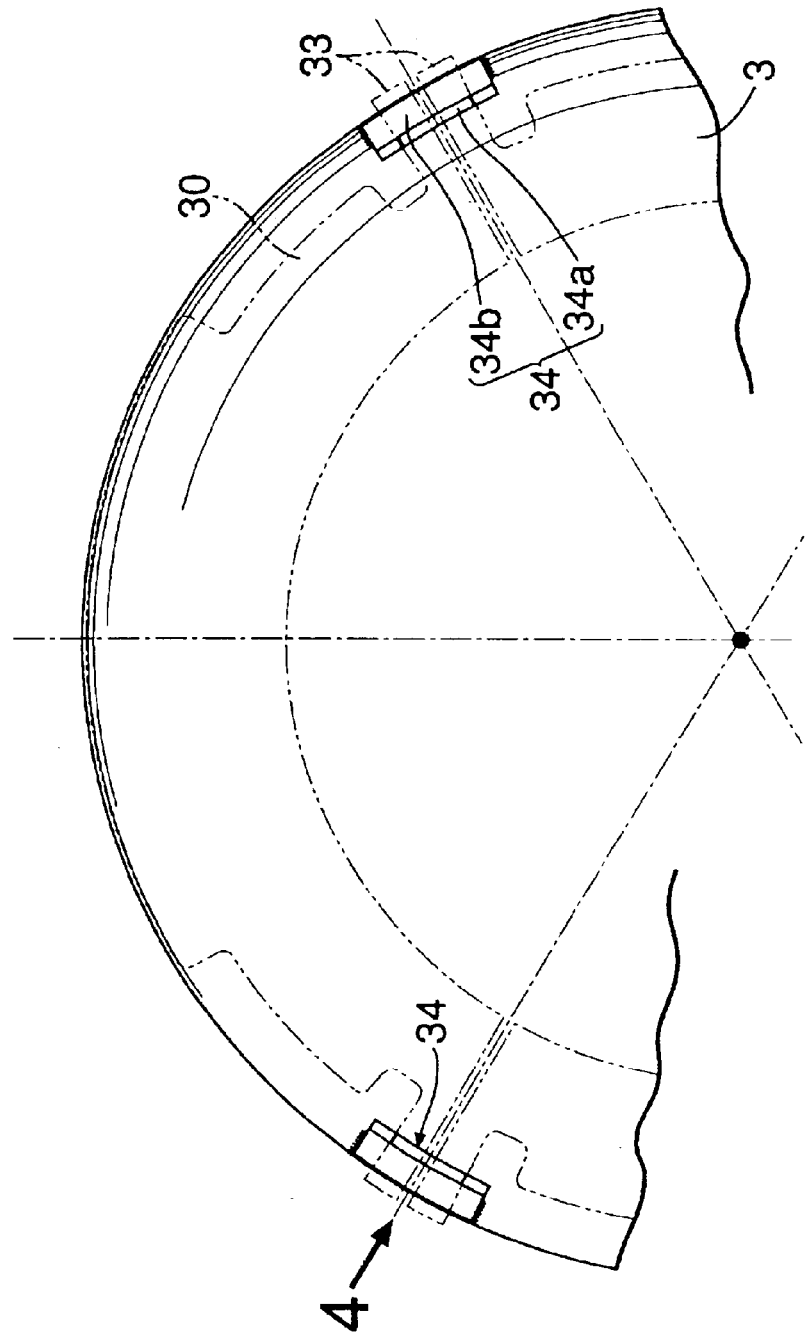
FIG. 3 is a view of an outer side of a turbine impeller in the torque converter.
Figure 4:
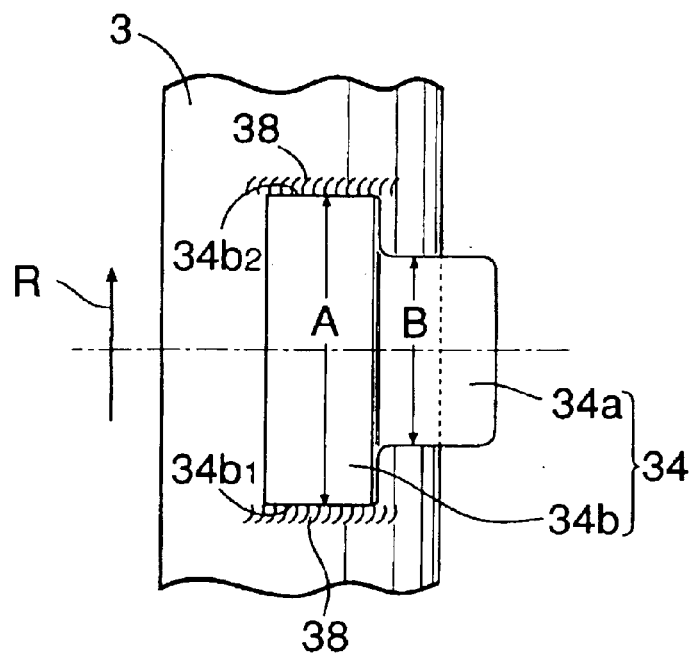
FIG. 4 is a view taken in a direction of an arrow 3 in FIG. 3.

As clearly shown in FIGS. 3 and 4, the second transmitting claws 34 are separated and independent from one another and each comprised of a claw piece 34a inserted between the adjacent damper springs 32, 32 in an opposed relation to the first transmitting claw 33, and a rectangular mounting base 34b integrally connected to a root of the claw piece 34a, so that it is formed into a T-shape as a whole. The second transmitting claw 34 is produced by punching a steel plate. The width A of the mounting base 34b in a direction R of rotation of the turbine impeller 3 is set larger than a width B of the claw piece 34a.

In the welding of each of the second transmitting claws 34 to the turbine impeller 3, opposite side ends $34b_1$ and $34b_2$ of the mounting base 34b arranged in the direction R of rotation of the turbine impeller 3 are TIG-welded to the outer peripheral surface of the turbine impeller 3. A weld zone 38 bonding each of the side ends $34b_1$ and $34b_2$ and the turbine impeller 3 is formed, so that its opposite ends extend to points outside each of the side ends $34b_1$ and $34b_2$.

Referring again to FIG. 1, a first oil passage 40 is provided in the central portion of the output shaft 10 to communicate with the outer chamber section 22b of the clutch chamber 22 through a transverse bore 39 and the thrust needle bearing 36. A second oil passage 41 is defined between the auxiliary-driving shaft 20 and the stator shaft 12 to communicate with an inner periphery of the circulation circuit 6 through the thrust needle bearings 37 and 37' and the free wheel 11. The first oil passage 40 and the second oil passage 41 are adapted to be connected alternately to a discharge side of the oil pump 21 and an oil reservoir 43 by the operation of a lock-up control valve 42.

The operation of the present embodiment will be described below.

In an operational range from an idling operation to a extremely low-speed operation of the engine, the lock-up control valve 42 is controlled by an electronic control unit (not shown), so that it connects the first oil passage 40 to the discharge side of the oil pump 21 and connects the second oil passage 31 to the oil reservoir 43, as shown in FIG. 1. Therefore, when a torque output from the crankshaft 1 of the engine is transmitted through the drive plate 8 and the side cover 5 to the pump impeller 2 to rotate the pump impeller 2, and further to drive the oil pump 21, the working oil discharged from the oil pump 21 is allowed to flow from the lock-up control valve 42 sequentially via the first oil passage 40, the transverse bore 39, the thrust needle bearing 36 and the outer chamber section 22b and the inner chamber section 22a of the clutch chamber 22 into the circulation circuit 6 to fill the circuit 6, and then flow sequentially via the thrust needle bearings 37 and 37' and the free wheel 11 into the second oil passage 41 and through the lock-up control valve 42 back to the oil reservoir 43.

In the clutch chamber 22, the pressure in the outer chamber section 22b is higher than that in the inner chamber section 22a as a result of the above-described flowing of the working oil, and the clutch piston 25 is urged away from the inner wall of the side cover 5 due to a difference between such pressures and hence, the lock-up clutch L is in the non-connecting state to permit the relative rotation of the pump impeller 2 and the turbine impeller 3. Therefore, when the pump impeller 2 is rotated from the crankshaft 1, the working oil filling the circulation circuit 6 is circulated in the circulation circuit 6, as indicated by an arrow, whereby the rotational torque of the pump impeller 3 is transmitted to the turbine impeller 3 to drive the output shaft 10.

If a torque amplifying action is produced between the pump impeller 2 and the turbine impeller 3 at that time, a resulting reaction force is borne by the stator impeller 4, and the stator impeller 4 is fixed by the locking action of the free wheel 11.

When the torque amplifying action is finished, the stator impeller 4 is rotated in the same direction along with the pump impeller 2 and the turbine impeller 3 by the reversion thereof in a direction of the torque, while racing the free wheel 11.

At the time when the torque converter T has been brought into its coupled state, the lock-up clutch 42 is switched over by the electronic control unit. As a result, the working oil discharged from the oil pump 21 flows in a direction opposite from the previous flowing direction from the lock-up control valve 42 via the second oil passage 41 into the circulation circuit 6 to fill the circuit 6 and then into the inner chamber section 22a of the clutch chamber 22 to fill the inner chamber section 22a. On the other hand, the outer chamber section 22b of the clutch chamber 22 is opened to the oil reservoir 43 through the first oil passage 40 and the lock-up control valve 42 and hence, in the clutch chamber 22, the pressure in the inner chamber section 22a is higher than that in the outer chamber section 22b. Thus, the clutch piston 25 is urged toward the side cover 5 due to a difference between the pressures, whereby the friction lining 28 is brought into pressure contact with the inner wall of the side cover 5 and in this manner, the lock-up clutch L is brought into the connecting state. Then, the rotational torque transmitted from the crankshaft 1 to the pump impeller 2 is transmitted mechanically from the side cover 5 through the clutch piston 25, the plurality of first transmitting claws 33, the damper springs 32 and the plurality of second transmitting claws 34 to the turbine impeller 3. Therefore, the pump impeller 2 and the turbine impeller 3 are brought into their directly connected states, whereby the torque output from the crankshaft 1 can be transmitted with a good efficiency to the output shaft 10, leading to a reduction in fuel consumption. If a sudden change in torque is produced between the pump impeller 2 and the turbine impeller 3 at that time, the damper spring 32 is compressed between the first and second transmitting claws 33 and 34, and in response to this, the pump impeller 2 and the turbine impeller 3 are rotated relative to each other, thereby absorbing a torque shock.

In such a torque converter T including the lock-up clutch, the plurality of second transmitting claws 34 welded to the outer peripheral surface of the turbine impeller 3 to transmit the torque to the damper springs 32 are independent from one another and hence, they can be made at a good yield from the steel plate by punching. Moreover, the second transmitting claws 34 are applicable to various torque converters T by setting the number of second transmitting claws 34 used and a mounting pitch freely depending on the specification of the torque converter T, thereby providing a remarkable reduction in manufacture cost.

In addition, the second transmitting claws 34 are welded in a dispersed manner to the outer peripheral surface of the turbine impeller 3 and hence, the turbine impeller 3 receives only a small quantity of heat and thus, the thermal strain of the turbine impeller 3 can be minimized. Further, the second transmitting claws 34 welded to the turbine impeller 3 are separated from one another with no member obstructing the flow of the working fluid being present between the second transmitting claws 34 and hence, the flow of the working fluid to the lock-up clutch L is smoothened, which can contribute to an enhancement in responsiveness of the lock-up clutch L.

Further, since each of the second transmitting claws 34 is formed in the T-shape comprised of the claw piece 34a inserted between the adjacent damper springs 32, 32 and the rectangular mounting base 34b integrally connected to the root of the claw piece 34a, with the opposite side ends $34b_1$ and $34b_2$ of the mounting base 34b being welded to the turbine impeller 3, the second transmitting claws 34 can sufficiently withstand the delivery of a large torque between the turbine impeller 3 and the damper springs 32 by setting the support span A in the rotational direction R at a value larger than the width B of the claw piece 34a.

Furthermore, since the opposite ends of the weld zone 38 bonding each of the side ends $34b_1$ and $34b_2$ of the mounting base 34b and the turbine impeller 3 to each other extend to the point outside each of the side ends $34b_1$ and $34b_2$, the mounting base 34b and the turbine impeller 3 are bonded to each other, particularly, at an intermediate portion of the weld zone 38, which is in a good welded state. Therefore, the states of the mounting base 34b and the turbine impeller 3 bonded to each other can be always maintained satisfactory.

Figure 5:
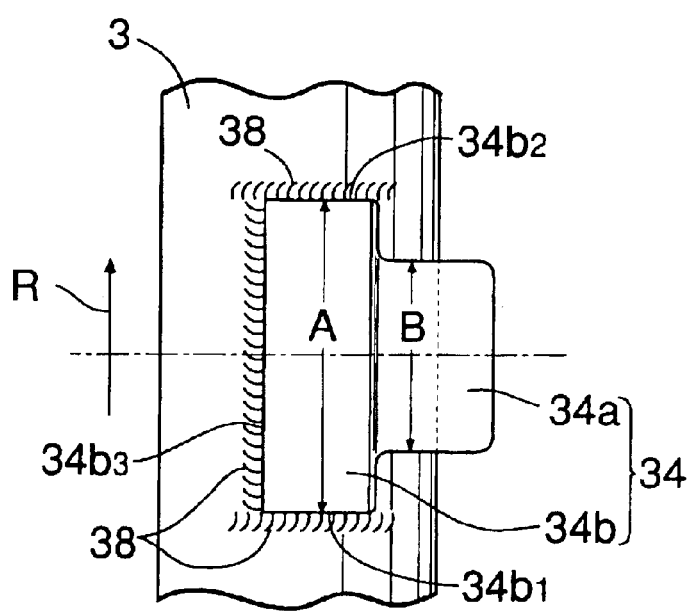
FIG. 5 is a view similar to FIG. 4, but showing a second embodiment of the present invention.

A second embodiment of the present invention shown in FIG. 5 is of an arrangement similar to that of the first embodiment, except that in the welding of a mounting base 34b of each second transmitting claw 34 to the outer peripheral surface of the turbine impeller 3, a radially inner end $34b_3$ of the mounting base 34b is also welded to the turbine impeller 3 in addition that opposite side ends $34b_1$ and $34b_2$ of the mounting base 34b are welded to the turbine impeller 3. In FIG. 5, portions or components corresponding to those in the first embodiment are designated by the same reference numerals, and the description of them is omitted.

According to the second embodiment, the three sides of the mounting base 34b are welded to the turbine impeller 3, whereby the welding strength can be increased sufficiently.

Figure 6:
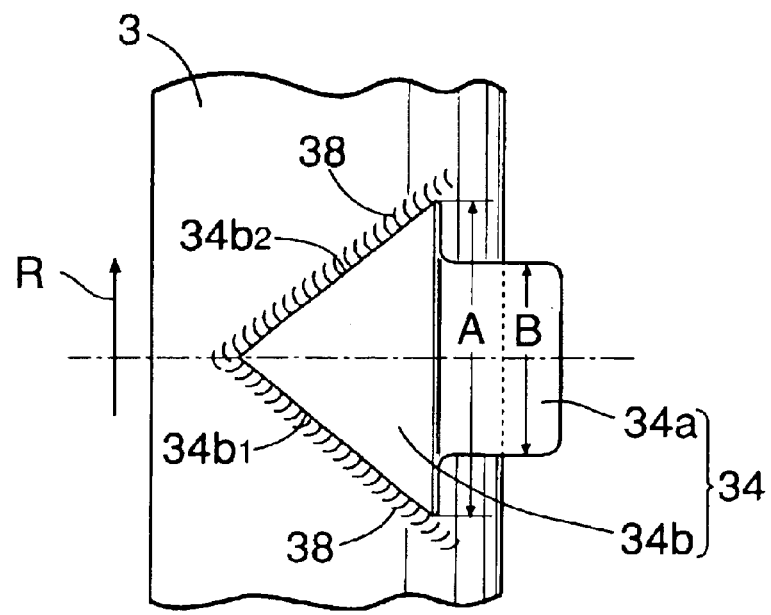
FIG. 6 is a view similar to FIG. 4, but showing a third embodiment of the present invention.

A third embodiment of the present invention shown in FIG. 6 is of an arrangement similar to that of the first embodiment, except that a mounting base 34b of each second transmitting claw 34 is formed into a triangular shape with a bottom connected to a root of a claw piece 34a, and inclined opposite side ends $34b_1$ and $34b_2$ of the mounting base 34b are welded to the turbine impeller 3. In FIG. 6, portions or components corresponding to those in the first embodiment are designated by the same reference numerals, and the description of them is omitted.

Figure 7:
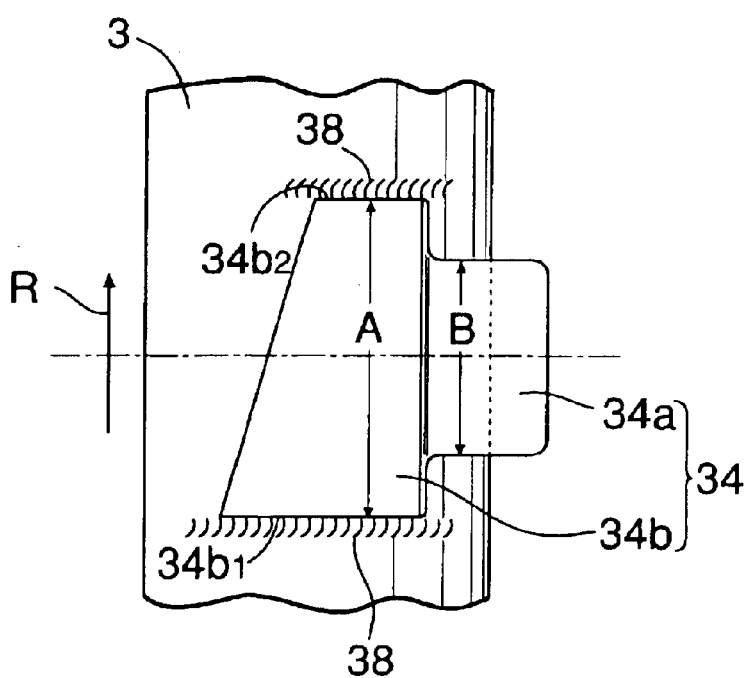
FIG. 7 is a view similar to FIG. 4, but showing a fourth embodiment of the present invention.

In a fourth embodiment of the present invention shown in FIG. 7, a mounting base 34b of each second transmitting claw 34 is formed into an irregular quadrilateral shape, and its opposite side ends $34b_1$ and $34b_2$ having different lengths are welded to the turbine impeller 3. In this case, the mounting base 34b is disposed with its side ends $34b_1$ having the larger length being turned in a direction opposite from the rotational direction R. With such configuration, when an accelerated torque of the engine is applied from the damper springs 32 to the second transmitting claws 34 upon connection of the lock-up clutch L, the accelerated torque can be borne by a relatively long weld zone 38 at the side end $34b_1$, because the longer side ends $34b_1$ of the mounting base 34b is disposed at a location closer to a point of application of the torque. This is advantageous for the strength. The other parts in construction are similar to those in the first embodiment and hence, portions or components corresponding to those in the first embodiment are designated by the same reference numerals in FIG. 7, and the description of them is omitted.

Although the embodiments of the present invention have been described in detail, it will be understood that the present invention is not limited to the above-described embodiments, and various modifications in design may be made without departing from the spirit and scope of the invention defined in the claims. For example, the present invention is also applicable to a fluid coupling having no stator impeller.

What is claimed is:

1. A fluid transmission system with a lock-up clutch, comprising a plurality damper springs accommodated in an annular arrangement in an annular spring-accommodating groove defined in a clutch piston of the lock-up clutch, a plurality of first transmitting claws provided on said clutch piston and each inserted between adjacent damper springs, and a plurality of second transmitting claws provided on a turbine impeller and each inserted between the adjacent damper springs in an opposed relation to said first transmitting claws, wherein said plurality of second transmitting claws are welded to the turbine impeller in a separated and independent manner.

2. A fluid transmission system with a lock-up clutch according to claim 1, wherein each of said second transmitting claws is comprised of a claw piece inserted between the adjacent damper springs, and a mounting base integrally connected to a root of said claw piece and having a width in a direction of rotation of the turbine impeller which is set at a value larger than that of said claw piece, opposite side ends of said mounting base arranged in the direction of rotation of the turbine impeller being welded to the turbine impeller.

3. A fluid transmission system with a lock-up clutch according to claim 2, wherein opposite ends of a weld zone bonding each of said side ends of said mounting base and the turbine impeller to each other are extended to points outside said side ends.

4. A fluid transmission system with a lock-up clutch according to claim 1, wherein each of the second transmitting claws is comprised of a claw piece inserted between the adjacent damper springs, and a mounting base integrally connected to a root of said claw piece and having a width in a direction of rotation of the turbine impeller which is set at a value larger than that of said claw piece, opposite side ends of said mounting base arranged in the direction of rotation of the turbine impeller and an inner end of the mounting base opposite from said claw piece being welded to the turbine impeller.

5. A fluid transmission system with a lock-up clutch according to claim 1, further comprising an annular spring-retaining member secured to said clutch piston, wherein said clutch piston includes a rim and wherein said annular spring retaining member and said rim define said annular spring-accommodating groove.

6. A fluid transmission system with a lock-up clutch according to claim 5, wherein a radially outward extending portion of said annular spring-retaining member covers a portion of a corresponding damper spring.

7. A fluid transmission system with a lock-up clutch according to claim 5, wherein said annular spring-retaining member is secured to said clutch piston by retaining means.

8. A fluid transmission system with a lock-up clutch according to claim 7, wherein said retaining means comprise a rivet.

9. A fluid transmission system with a lock-up clutch according to claim 5, wherein said annular spring-retaining member comprises a plurality of fan-shaped portions separated circumferentially at central portions of said first transmitting claws.

* * * * *